(12) United States Patent
Cook et al.

(10) Patent No.: US 11,877,340 B2
(45) Date of Patent: Jan. 16, 2024

(54) WIRELESS BACKHAUL MONITORING AND WIRELESS LINK MANAGEMENT

(71) Applicant: Charter Communications Operating, LLC, St. Louis, MO (US)

(72) Inventors: Charles I. Cook, Castle Rock, CO (US); Praveen C. Srivastava, Ashburn, VA (US); Vikas Sarawat, Broomfield, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 335 days.

(21) Appl. No.: 17/084,048

(22) Filed: Oct. 29, 2020

(65) Prior Publication Data
US 2022/0141911 A1    May 5, 2022

(51) Int. Cl.
*H04W 76/20* (2018.01)
*H04W 36/00* (2009.01)
*H04W 88/14* (2009.01)
*H04W 24/08* (2009.01)

(52) U.S. Cl.
CPC ........... *H04W 76/20* (2018.02); *H04W 24/08* (2013.01); *H04W 36/00837* (2018.08); *H04W 88/14* (2013.01)

(58) Field of Classification Search
None
See application file for complete search history.

(56) References Cited

U.S. PATENT DOCUMENTS

| | | | |
|---|---|---|---|
| 8,654,771 B1* | 2/2014 | Singh | H04W 28/0247 370/473 |
| 9,155,020 B1* | 10/2015 | Graffagnino | H04L 45/12 |
| 2008/0039092 A1* | 2/2008 | Kitazoe | H04W 36/0055 455/436 |
| 2009/0264123 A1* | 10/2009 | Agashe | H04W 48/20 455/434 |
| 2012/0327794 A1* | 12/2012 | Han | H04W 52/46 370/252 |
| 2019/0083890 A1* | 3/2019 | van der Laan | H04N 21/4781 |
| 2019/0312784 A1* | 10/2019 | Altay | H04L 41/122 |

* cited by examiner

*Primary Examiner* — Suhail Khan
(74) *Attorney, Agent, or Firm* — Armis IP Law, LLC

(57) ABSTRACT

A communication management resource such as associated with or at a first wireless access point monitors a corresponding backhaul providing connectivity between the first wireless access point and a remote network. Based on the monitoring of the backhaul, the communication management resource produces status information indicating a status such as ability of the backhaul to convey data communications between the first wireless access point and the backhaul. The first wireless access point then controls wireless connectivity between the first wireless access point and a mobile communication device based on the status of the backhaul.

38 Claims, 9 Drawing Sheets

FIG. 2

| TIME | PERFORMANCE | SYMBOL 172 |
|---|---|---|
| | STATUS INFO. 151 | |
| T1 ......... | U.L. BW = 300 MBS, D.L. BW = 600 MBS, LATENCY LOW | BH PERF = VG |
| T2 ......... | U.L. BW = 300 MBS, D.L. BW = 600 MBS, LATENCY LOW | BH PERF = VG |
| T3 ......... | U.L. BW = 300 MBS, D.L. BW = 600 MBS, LATENCY LOW | BH PERF = VG |
| T4 ......... | U.L. BW = 300 MBS, D.L. BW = 600 MBS, LATENCY LOW | BH PERF = VG |
| T5 ......... | U.L. BW = 300 MBS, D.L. BW = 600 MBS, LATENCY LOW | BH PERF = VG |
| T6 ......... | U.L. BW = 300 MBS, D.L. BW = 600 MBS, LATENCY LOW | BH PERF = VG |
| T7 ......... | U.L. BW = 300 MBS, D.L. BW = 600 MBS, LATENCY LOW | BH PERF = VG |
| T8 ......... | U.L. BW = 300 MBS, D.L. BW = 600 MBS, LATENCY LOW | BH PERF = VG |
| T9 ......... | U.L. BW = 300 MBS, D.L. BW = 600 MBS, LATENCY LOW | BH PERF = VG |
| T10 ....... | U.L. BW = 300 MBS, D.L. BW = 600 MBS, LATENCY LOW | BH PERF = VG |
| T11 ....... | U.L. BW = 50 MBS, D.L. BW = 60 MBS, LATENCY MED. | BH PERF = POOR |
| T12 ....... | U.L. BW = 5 MBS, D.L. BW = 10 MBS, LATENCY HIGH | BH PERF = POOR |
| T13 ....... | U.L. BW = 0 MBS, D.L. BW = 0 MBS, LATENCY HIGH | BH PERF = POOR |
| T14 ....... | U.L. BW = 0 MBS, D.L. BW = 0 MBS, LATENCY HIGH | BH PERF = POOR |
| T15 ....... | U.L. BW = 0 MBS, D.L. BW = 0 MBS, LATENCY HIGH | BH PERF = POOR |
| ... | | |

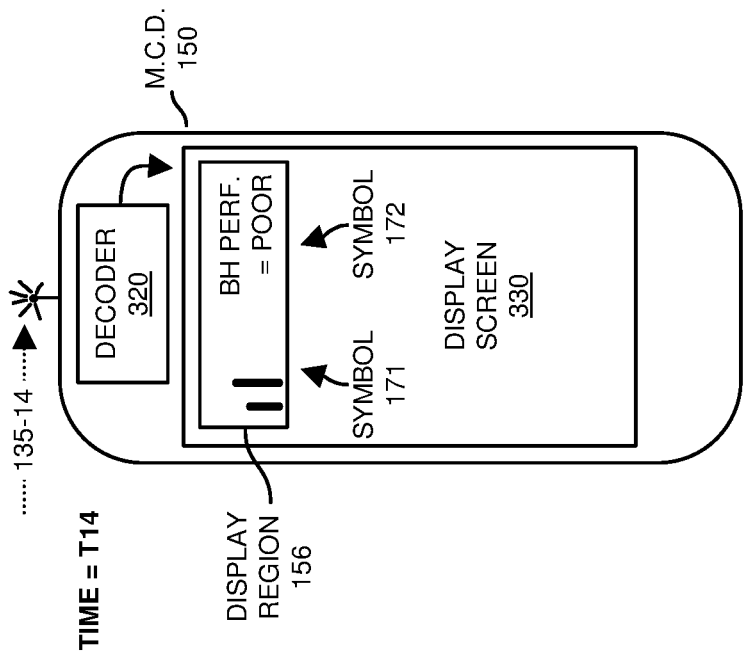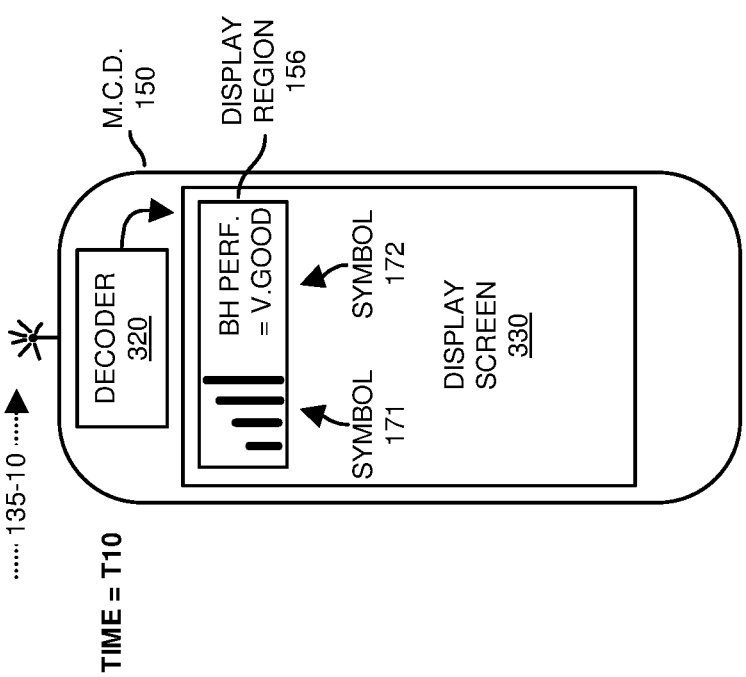
FIG. 3

WIRELESS BACKHAUL MONITORING AND
WIRELESS LINK MANAGEMENT

BACKGROUND

Conventional wireless networks provide connectivity of mobile communication devices to the Internet via respective wireless access points such as based on wireless protocols including WiFi™, LTE (Long Term Evolution), NR (New Radio), etc.

As an example, assume that a mobile communication device establishes a respective wireless communication link with a first wireless access point. The first wireless access point is coupled to a so-called backhaul that connects the first wireless access point to a remote network such as the Internet. Via communications over the respective wireless communication link, and corresponding backhaul, the mobile communication device is able to send/receive data over the Internet.

In many instances, a respective mobile communication device moves from one location to another in a respective wireless network environment. In such an instance, the mobile communication device may move out of wireless communication range with respect to the first wireless access point, requiring a respective handoff of the wireless communication link to a second wireless access point in the wireless network environment that is better able to provide the user equipment better connectivity to the remote network such as the Internet.

A mobile communication device may provide notification to a user that the performance of a respective wireless communication link is degrading via display of fewer bars, indicating reduced wireless signal strength between the mobile communication device and the corresponding wireless base station.

In general, conventional wireless handoffs require the source cell (current wireless access point to which the mobile communication device is connected) to prepare the target mobile communication device for the handoff, initiate the handoff of the mobile communication device from the first wireless access point to the second wireless access point, and complete the respective user equipment handoff by redirecting uplinks/downlinks associated with the wireless communication link. In certain instances, the wireless access point/network can be configured to forward any buffered communications so that the second wireless access point receiving the handoff is able to provide the user equipment continued access to the remote network such as the Internet.

BRIEF DESCRIPTION OF EMBODIMENTS

Embodiments herein include providing improved techniques of controlling connectivity of a respective mobile communication device to a wireless access point.

More specifically, a communication management resource such as associated with or executed at a first wireless access point monitors a corresponding backhaul providing connectivity between the first wireless access point and a remote network. Based on the monitoring of the backhaul, the communication management resource produces status information (or performance information) indicating a status of the backhaul such as ability/inability of the backhaul to convey data communications between the first wireless access point and the remote network. The first wireless access point then controls wireless connectivity between the first wireless access point and a mobile communication device based at least in part on the status (such as health or performance) of the backhaul.

Note that the backhaul as described herein can be established and/or implemented in any suitable manner. For example, in one embodiment, the backhaul is a dedicated communication link (wired or wireless) established between the first wireless access point and the remote network.

In one nonlimiting example embodiment, the communication management resource is disposed (resides) in a subscriber domain. The communication management resource establishes the backhaul as a connection through a cable modem and cable modem termination system to the remote network.

When the backhaul is implemented based at least in part on cable modem technology such as supporting DOCSIS (Data Over Cable Service Interface Specification) or other suitable communication protocol, the backhaul connection through the cable modem (first gateway) and the cable modem termination system (second gateway) may become unavailable due to testing, maintenance, etc., of the corresponding backhaul or shared communication link between the cable modem and the cable modem termination system. In such an instance, the backhaul is temporarily unavailable. In response to the communication management resource receiving notification of temporary unavailability of the backhaul due to testing or general maintenance, the communication management resource notifies the mobile communication device of the unavailability and/or initiates termination of the wireless connectivity between the first wireless access point and the mobile communication device.

As further discussed herein, there are many ways in which the communication management resource can be configured to control/initiate termination of the respective wireless communication link between the first wireless access point in the mobile communication device.

For example, further embodiments herein include, via the communication management resource or other suitable entity, communicating a message from the first wireless access point to the first mobile communication device in response to detecting degradation of the ability (i.e., performance) of the backhaul to convey the data communications over the backhaul. In one embodiment, the message communicated to the mobile communication device includes the status information indicating the inability of the backhaul to support communications.

Further embodiments herein include, instead of a notification of ability or inability, providing status information indicating to what degree the backhaul has degraded and force a handoff based on crossing a threshold.

For example, in one embodiment, the degree of degradation could be based on the level of utilization in the backhaul. If the utilization of the backhaul exceeds the provisioned threshold, the wireless access point can force a handoff to a neighboring access point.

In another embodiment the communications device (user equipment or UE) can be configured to initiate action based on information passed to it from the access point and the UE can initiate a handoff when a threshold has been crossed.

Alternatively the utilization level can be communicated to the UE. The UE can examine the threshold/utilization level and determine a desirable course of action. One possible course of action is to check the utilization level of a neighboring access point within range of the UE. If the utilization level of the neighboring access point is lower, the UE may decide to initiate a handover to the neighboring access point for the opportunity of better throughput. In this manner, the overall throughput performance of a system of UEs, access points, and backhaul can be maximized.

In cases of redirecting a respective user equipment (mobile communication device) due to crossing a threshold, and the backhaul is functioning properly, it may not be appropriate to lower the transmit power of the access point because it would affect all communication devices connected to the access point. Instead, by passing threshold/congestion data to the UE, the UE can review such information and initiate an appropriate action as a response.

Note further that the terms threshold and degradation are used in several places. Adding the ability to initiate a handoff to another access point for the purposes of performance of the connection itself or the overall performance of the system is consistent with the use of these term.

Note that in in accordance with further example embodiments, the status information is or includes display information encoded for display on a predetermined or dedicated display region of a display screen of the mobile communication device. The display information indicates a respective status of the backhaul.

In one embodiment, the display information (and corresponding status message) is complementary with respect to a display symbol on the mobile communication device indicating a strength of wireless signals and/or wireless connectivity between the mobile communication device and the first wireless access point. A high wireless signal strength only indicates that the wireless connection between the mobile communication device and the wireless access point is good. As a complement to the signal strength information, the display information associated with the backhaul as described herein indicates a status of the backhaul and its ability to provide connectivity of the mobile communication device with the remote network through the backhaul.

Thus, embodiments herein include, via the communication management resource, communicating display information (such as encoded status information) to the first mobile communication device, the display information indicating the ability of the backhaul to convey the data communications. In one embodiment, the display information is simultaneously displayed in the dedicated display region with the wireless signal strength information via display of one or more symbols. Note further that if space is limited on the display screen of the mobile communication device, embodiments herein can include alternating display of the wireless signal strength and backhaul status information at different times in the same display region of the display screen.

In accordance with further embodiments, the first wireless access point controls or initiates a respective handoff of the first mobile communication device to a second wireless access point in response to detecting degradation and/or the inability of the backhaul to support communications above a performance threshold value. For example, in one embodiment, in furtherance of initiating a respective handoff of the first mobile communication device with another wireless access point, the communication management resource (or first wireless access point) can be configured to communicate neighbor list information indicating one or more other wireless access points (other than the first wireless access point) such as a second wireless access point in which to potentially handoff the first mobile communication device.

In yet further example embodiments, the first wireless access point establishes a wireless communication link between the first wireless access point and the first mobile communication device. In response to detecting performance degradation of the backhaul and its ability to convey the data communications below a performance threshold, the communication management resource reduces a wireless transmit power level of the first wireless access point transmitting wireless communications over the wireless communication link to the first mobile communication device. Reducing the transmit power level of the first wireless access point results in a handoff of the first mobile communication device from the first wireless access point to a second wireless access point because the first mobile communication device detects the reduced transmit power level such as the receiving the wireless communications from the first wireless access point at a lower power level. In one embodiment, the first mobile communication device initiates a handoff from the first wireless access point in response to detecting that the power level of receiving wireless communications from the first wireless access point falls below a respective power threshold value. Accordingly, embodiments herein include controlling a transmit power level of communications to a mobile communication device to initiate a respective handoff.

In accordance with still further example embodiments, the backhaul is an only available connection between the first wireless access point and the remote network. Alternatively, the backhaul as described herein is one of multiple (redundant) connections (backhauls) providing the first wireless access point connectivity to the remote network. In this latter instance, if the primary backhaul happens to fail (such as performance below a threshold value), the first wireless access point provides wireless connectivity via communications over a secondary backhaul connection with the remote network.

In yet further example embodiments, the communication management resource is configured to determine a respective health of the backhaul in any suitable manner. In one embodiment, the communication management resource (such as in the first wireless access point or other suitable location disparately located with respect to the first wireless access point) occasionally and/or repeatedly tests the ability (health) of the backhaul to convey data via communication of test messages (such as pings/ping responses, heartbeat communications, etc.) over the backhaul.

In yet further example embodiments, in response to detecting degradation of the ability of the backhaul to convey the data communications, the first wireless access point rejects a new association (such as wireless communication link request) of a second mobile communication device attempting to establish a wireless communication link between the second mobile communication device and the first wireless access point. Thus, even though a respective wireless communication link between the second mobile communication device and the first wireless access point is above a threshold value indicating good wireless performance, the communication management resource associated with the first wireless access point can be configured to reject any new association request from the second mobile communication device such as in response to a condition in which the backhaul will not be able provide sufficient communication performance on behalf of the second mobile communication device.

In still further example embodiments, in response to detecting degradation of the ability of the backhaul to convey respective data communications, the communication management resource of the first wireless access point can be configured to discontinue broadcasting wireless beacons (discovery notifications) indicating availability of the first wireless access point in a respective network environment.

This prevents any new mobile communication devices from attempting to establish wireless connectivity with the first wireless access point.

In still further example embodiments, the mobile communication device supports multi-link capability. For example, in one embodiment, the first mobile communication device is in wireless communication with the first wireless access point over a first wireless communication link. The first mobile communication device is also in wireless communication with a second wireless access point over a second wireless communication link. The second wireless communication link provides the first mobile communication device backup access to the remote network with respect to the first wireless communication link providing the mobile communication device access to the remote network. In such an instance, if a primary backhaul or wireless link associated with the first wireless access point fails or communication performance of either resources falls below a performance threshold value, the first mobile communication device communicates over the wireless link with the second wireless access point, which has a secondary backhaul that operates above a performance threshold value.

Embodiments herein are useful over conventional techniques. For example, embodiments herein provide a unique way of controlling wireless connectivity during different types of operating conditions such as when the backhaul operates below a threshold value.

This disclosure further includes the observation that femtocells, small cells, and other wireless access point technologies depend on backhaul to provide wireless services to respective user equipment. If the performance of the backhaul is reduced such as due to a failure, congestion, maintenance, etc., the user equipment no longer has network access because there is no connectivity from the wireless access point to the network. Embodiments herein include monitoring network connectivity. If connectivity fails, the transmitter directs the user equipment to register with different wireless access devices in order to provide continued wireless service and improve customer experience. In one embodiment, the backhaul is congested to above a threshold such that, if the communication device gets handed off to a neighboring access point, the overall system improves and the customer experiences improved communication performance. One way to force user equipment to another radio network is to force a handoff from cell site A to cell site B. More specifically, one way to force a handover of user equipment from one wireless access point to another is to reduce the wireless transmit power of the wireless access point at cell site A to the point that the user equipment determines that cell site B is a better radio in which to connect because cell site A and corresponding wireless access point appears to be failing. In such an instance, to the user equipment, it appears that it has traveled away from cell site A and a handover is needed when in reality cell site A has simply reduced its power to force a respective handoff. In one embodiment, to know when cell site A needs to reduce transmit power to initiate a handoff of the user equipment to another wireless access point, the wireless access point at cell site A monitors the wireless network. If the backhaul of the wireless access point associated with cell site A is lost (such as conveyance performance degrades below a threshold value), the wireless access point at cell site A reduces transmit power to force the user equipment to connect to a different cell site (wireless access point).

As previously discussed, network connection performance can be detected in a number of different ways including generation of periodic pings to a known server, reading the state of the access device, etc.

Embodiments herein further include providing dual connectivity capability to the user equipment as previously discussed. For example, the user equipment connects to a primary service via a femtocell. The user equipment connects to a secondary wireless service, for example, an MVNO (Mobile Virtual Network Operators) partner. The femtocell is configured to be the primary service. When the backhaul associated with the femtocell fails, the secondary wireless service assumes carrying the traffic. In this way, the femtocell does not continue transmitting a full power resulting in the user equipment staying connected to it while unable to gain access to the broadband network.

Note that any of the resources as discussed herein can include one or more computerized devices, communication management resources, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (such as any computer readable hardware storage medium, computer readable storage hardware, etc.) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage hardware medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate location detection and allocation of one or more wireless channels in a network environment. The instructions, when executed by computer processor hardware, cause the computer processor hardware (such as one or more co-located or disparately processor devices or hardware) to: monitor a backhaul providing connectivity between a first wireless access point and a remote network; based on the monitoring, produce status information indicating an ability of the backhaul to convey data communications between the first wireless access point and the remote network; and control wireless connectivity between the first wireless access point and a first mobile communication device based on the status of the backhaul.

Note that the ordering of the steps above has been added for clarity sake. Further note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing wireless communication services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 2 is an example diagram illustrating collection and generation of status information according to embodiments herein.

FIG. 3 is an example diagram illustrating display of status information associated with a backhaul according to embodiments herein.

Figure 1:
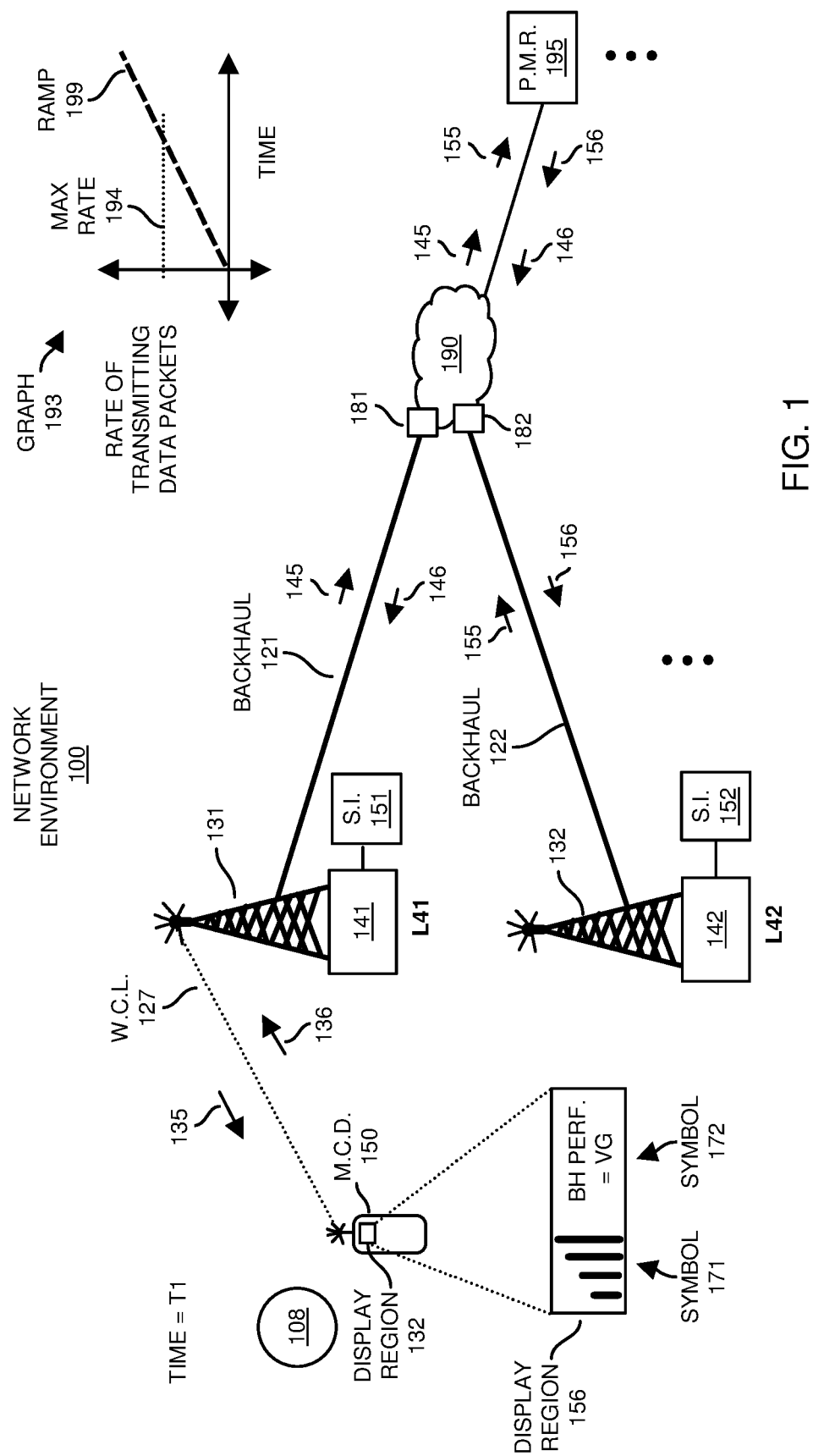
FIG. 1 is an example diagram illustrating a communication network environment and respective interconnectivity of devices according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Embodiments herein include a communication management resource such as associated with or executed at a first wireless access point. The communication management resource monitors a corresponding backhaul providing connectivity between the first wireless access point and a remote network. The backhaul conveys communications associated with a mobile communication device wirelessly connected to the first wireless access point. Based on the monitoring of the backhaul, the communication management resource produces status information (performance information) indicating a status of the backhaul such as ability/inability of the backhaul to convey data communications between the first wireless access point and the backhaul. The first wireless access point controls wireless connectivity between the first wireless access point and a mobile communication device based on the status (such as health or performance) of the backhaul. For example, in response to detecting performance degradation of the backhaul, the first wireless access point initiates termination and/or a handoff of the mobile communication device to a second wireless access point.

Now, more specifically, with reference to the drawings, FIG. 1 is an example diagram illustrating a communication network environment and respective wireless connectivity according to embodiments herein.

As shown, network environment 100 includes multiple disparately located wireless access points including wireless access point 131 at location L41, wireless access point 132 at location L42, etc. Each of the wireless access points supports communications via any of one or more wireless communication protocol (such as Wi-Fi™, LTE, etc.).

As further shown, each of the wireless access points includes at least one backhaul providing connectivity of the respective wireless access point (a.k.a., wireless base station, communication device, etc.) to the remote network 190.

For example, backhaul 121 (such as a hardwired or wireless communication link) provides connectivity between the wireless access point 131 and the remote network 190; backhaul 122 (such as a hardwired or wireless communication link) provides connectivity between the wireless access point 132 and the remote network 190; and so on.

Note that mobile communication device 150 and/or a respective wireless access point (or other suitable entity) is able to handoff connectivity (such as wireless communication link 127) from one wireless access point to another depending on a performance status of the supporting backhaul.

As further shown, each of the wireless access points provides one or more mobile communication devices (such as user equipment) wireless connectivity and corresponding access to remote network 190. For example, mobile communication device 150 establishes a respective wireless communication link 127 with the wireless access point 131.

Via the wireless communication link 127, the mobile communication device transmits wireless communications 136 to the wireless access point 131. The communication management resource 141 of the wireless access point 131 converts the received wireless communications 136 into respective one or more communications transmitted from the respective wireless access point 131 over the backhaul 121 to remote network 190 for delivery to corresponding one or more target communication devices (such as servers or other suitable resources) in remote network 190.

In a reverse direction, the wireless access point 131 receives communications 146 targeted for delivery to the mobile communication device 150. The wireless access point 131 receives communications 146 over backhaul 121 from the remote network 190. The communication management resource 141 converts the received communications 146 into wireless communications 135 transmitted over the wireless communication link 127 to the mobile communication device 150.

Accordingly, the combination of the wireless communication link 127 and backhaul 121 provides the corresponding mobile communication device 150 access to the remote network 190.

Note that any of the components in network environment 100 can be instantiated in a suitable manner. For example, the wireless access point 131 can be implemented as wireless access point hardware, wireless access point software, or a combination of wireless access point hardware and wireless access point software; communication management resource 141 can be implemented as communication management hardware, communication management software, or a combination of communication management hardware and communication management software; mobile communication device 150 can be implemented as mobile communication hardware, mobile communication software, or a combination of mobile communication hardware and mobile communication software; and so on. In accordance with further example embodiments, the communication management resource 141 (monitor, controller, analyzer, etc., or other suitable entity) such as associated with or executed at a first wireless access point 131 monitors a corresponding backhaul 121 providing connectivity between the first wireless access point 131 and the remote network 190.

Based on the monitoring of the backhaul 121 and ability to support conveyance of communications, the communication management resource 141 produces status information 151 indicating a performance status of the backhaul 121 such as ability/inability (performance) of the backhaul to convey data communications between the first wireless access point 131 and the remote network 190.

Based at least in part on the status information 151 (such as indicating health or a performance of the backhaul 121), in one embodiment, the first wireless access point 131 then controls wireless connectivity between the first wireless access point 131 and the mobile communication device 150.

Note that each of the backhauls as described herein can be established and/or implemented in any suitable manner. For example, in one embodiment, a respective backhaul (121, 122, etc.) is a dedicated communication link (wired or wireless) established between the respective wireless access point and the remote network 190. In accordance with still further example embodiments, note that the backhaul 121 may be the only available connection between the first wireless access point 131 and the remote network 190. Alternatively, the backhaul 121 is one of multiple (redundant) connections providing the first wireless access point 131 connectivity to the remote network. In the latter instance of implementing multiple backhauls from a respective wireless access point to the remote network, if the primary backhaul 121 happens to fail (such as performance below a threshold value), the first wireless access point 131 provides connectivity to the mobile communication devices via communications over a secondary backhaul connection between the first wireless access point 131 and the remote network 190.

In yet further example embodiments, the connection management resource 141 is configured to determine a respective health/performance of the backhaul 121 in any suitable manner.

For example, in one embodiment, the communication management resource 141 is configured to determine performance of the backhaul based on current communications (such as amount, delay, etc.) over the backhaul 121. Additionally, or alternatively, the communication management resource 141 occasionally and/or repeatedly tests the ability (health) of the backhaul 121 to convey data via communication of test messages (such as pings/ping responses, heartbeat communications, etc.) over the backhaul 121.

The communication management resource 141 resides at any suitable location. For example, the communication management resource 141 is disposed at the first wireless access point or other suitable location disparately located with respect to the first wireless access point.

In still further example embodiments, as further shown, the network 190 includes performance management resource 195 such as an iPerf™ client or any other suitable performance tester.

Note that the performance management resource 195 can be located anywhere in network environment 100. For example, the performance management resource 195 can be located in network 190, the performance management resource 195 can be implemented in one or more edge nodes 181, 182, etc.

In one embodiment, the communication management resource 141 associated with wireless access point 131 initiates a performance evaluation of the backhaul 121 via transmission of one or more communications 145 (such as commands and/or test communications) to the performance management resource 195 such as over backhaul 121.

In further example embodiments, the one or more communications 145 communicated to the performance management resource 195 notifies the performance management resource 195 to test the candidate backhaul link 121.

The communication management resource 141 can initiate any of multiple different types of tests to test the performance associated with backhaul 121. For example, in one embodiment, to initiate a round-trip time test, the communication management resource 141 communicates a ping message from the wireless access point 131 over the backhaul 121 and through the node 181 to the performance management resource 195. The performance management resource 195 receives the ping message (such as via communications 145).

In response to receiving the ping message, the performance management resource 195 communicates a respective ping response (such as via communications 146) through network 190 and the node 181 over backhaul 121 to the communication management resource 141 of the wireless access point 131. To produce a round trip time value, the communication management resource 141 and/or the performance management resource 195 keeps track of the round-trip time of transmitting the initial ping message and receiving a respective ping response from the performance management resource 195.

In one embodiment, one or more round-trip time values obtained during testing of the backhaul 121 between the wireless access point 131 and the performance management resource 195 are recorded in corresponding status information 151 (performance information).

If desired, note that this process of testing round-trip communication time can be repeated multiple times to produce an average round-trip time of transmitting data packets over the backhaul 121 being tested. As further discussed below, the round-trip times provide a basis to evaluate the performance of the backhaul 121. For example, lower round-trip times (low latency) are typically preferred.

Note that further embodiments herein include testing a data throughput performance (bandwidth) associated with the backhaul 121.

For example, in one embodiment, to test the ability to receive data packets in a downlink direction from the network 190 over candidate backhaul 121 to the wireless access point 131, the performance management resource 195 communicates a bandwidth test command to the communication management resource 141.

In response to receiving the bandwidth test command, the performance management resource 195 communicates data packets (such as via communications 146) from the performance management resource 195 over the backhaul 121 to the communication management resource 141.

In one embodiment, as further shown in graph 193 in FIG. 1, the performance management resource 195 can be configured to ramp 199 (increase over time) a rate at which data packets (such as communications 146) are communicated through node 181 over backhaul 121 to the wireless access point 131 over time to determine the maximum rate 194 at which the backhaul 121 supports conveyance of data packet communications. Ramp 99 can be linear or non-linear to characterize how the backhaul system reacts to performance.

For each test time (different times of testing backhaul such as at time T1, time T2, time T3, etc.), the performance management resource 195 and/or the communication management resource 141 keep track of a maximum rate 194 (threshold rate in graph 193) at which the performance management resource 195 is able to support downlink communications over the backhaul 121 to the wireless access point 131 without congestion.

Subsequent to determining the maximum available downlink bandwidth rate in a manner as previously discussed, the communication management resource 141 stores the detected available downlink bandwidth rate for the backhaul 121 being tested in status information 150.

In a similar manner, the communication management resource 141 and performance management resource 195 can be configured to track the available uplink bandwidth rate associated with the backhaul 121 being tested. This can include the communication management resource 141 and/or performance management resource 195 (or other target device) tracking a rate of transmitting data packets in an uplink direction from the wireless access point 131 over the backhaul 121 through edge node 181 to the performance management resource 195.

In one embodiment, in a similar manner as previously discussed to test downlink communications, to determine uplink performance, the communication management resource 141 can be configured to ramp a rate of transmitting communications 145 over the backhaul 121 to the performance management resource 195.

After determining the maximum uplink rate, the communication management resource 141 stores the available uplink bandwidth rate for the backhaul 121 being tested in status information 151.

In this manner, the status information 151 keeps track of round-trip time capability of communicating over the backhaul 121 and/or uplink and downlink bandwidth performance (available bandwidth) associated with the backhaul 121 at different points in time.

The communication management resource 141 can be configured to notify the mobile communication device 150 (or other supported mobile communication devices) of the performance associated with the backhaul 121 over time.

For example, in one embodiment, the communication management resource 141 produces status information symbol 172 via encoding of a portion of status information 151 indicating backhaul performance. The communication management resource communicates the encoded symbol 172 (such as display information) over the wireless communication link to the mobile communication device 150. The mobile communication device 150 decodes the received display information and displays the corresponding decoded symbol 172 on a respective display screen 130 of the mobile communication device 150. The symbol 172 indicates a performance status of the backhaul 121.

In one embodiment, the display region 156 is dedicated to display information associated with the performance of backhaul 121 and signal strength associated with wireless communication link 127.

Note further that the mobile communication device 150 can be configured to continuously monitor a signal strength (such as power level) of receiving respective wireless communications 135 from the wireless access point 131 over the wireless communication link 127. Based on the detected power level of received communications 135, the mobile communication device 150 displays symbol 171 indicating a respective strength of the received communications 135. In this case, the greater the number of bars in symbol 171, the greater the corresponding signal strength of receiving communications 135 from the mobile communication device 150.

Via the display of the symbol 172 on the mobile communication device 150, the communication management resource 141 notifies the user 108 of the performance status of the corresponding backhaul 121. As previously mentioned, the displayed symbol 171 notifies the user 108 of the mobile communication device 150 of a signal strength of the mobile communication device 150 receiving wireless communications 135 from the wireless access point 131. Both parameters (wireless signal strength as indicated by the symbol 171 and backhaul performance as indicated by the symbol 172) play a substantial role in notifying the user of the ability to access remote network 190 via a combination of the wireless communication link 127 and the backhaul 121. Note that the status indicators such as symbol 171 and symbol 172 can be merged into a single symbol with varying strength indicators, or displayed as separate indicators, or rotated in a round-robin or similar alternating/rotating fashion to communicate various performance indicators while occupying a minimum of display space on a respective display screen of the mobile communication device 159.

FIG. 2 is an example diagram illustrating collected status information according to embodiments herein.

In this example embodiment, the communication management resource 141 produces the status information 151 based on one or more parameters such as uplink bandwidth available in the backhaul 121, downlink bandwidth available in backhaul 121, latency of communications associated with backhaul 121, etc.

The communication management resource 141 updates the status information 151 over time to indicate current backhaul 121 performance. The backhaul 121 is tested in any suitable manner such as previously discussed.

For example, based on backhaul testing (such as in a manner as previously discussed) at or around time T1, the communication management resource 141 detects that the backhaul 121 provides a good uplink bandwidth of 300 MBS (Mega Bytes per Second), a good downlink bandwidth of 600 MBS, and a low latency (low communication transmission delay). As shown, the communication management resource 141 records this performance information obtained at or around time T1 in status information 151. The communication management resource 141 or other suitable entity assigns a grade of very good (VG) or other suitable value to the symbol 172 associated with the performance of backhaul 121 to indicate very good backhaul performance.

Based on further backhaul testing (such as in a manner as previously discussed) at or around time T2, the communication management resource 141 detects that the backhaul 121 provides a good uplink bandwidth of 300 MBS (Mega Bytes per Second), a good downlink bandwidth of 600 MBS, and a low latency (low communication transmission delay). As shown, the communication management resource 141 records this performance information obtained at or around time T2 in status information 151. The communication management resource 141 or other suitable entity assigns a grade of very good (VG) to the symbol 172 associated with the performance of backhaul 121 to indicate very good backhaul performance.

Based on further backhaul testing (such as in a manner as previously discussed) at or around time T3, the communication management resource 141 detects that the backhaul 121 provides a good uplink bandwidth of 300 MBS (Mega Bytes per Second), a good downlink bandwidth of 600 MBS, and a low latency (low communication transmission delay). As shown, the communication management resource 141 records this performance information obtained at or around time T3 in status information 151. The communication management resource 141 or other suitable entity assigns a grade of very good (VG) to the symbol 172 associated with the performance of backhaul 121 to indicate very good backhaul performance.

Based on further backhaul testing (such as in a manner as previously discussed) at or around time T10, the communication management resource 141 detects that the backhaul 121 provides a good uplink bandwidth of 300 MBS (Mega Bytes per Second), a good downlink bandwidth of 600 MBS, and a low latency (low communication transmission delay). As shown, the communication management resource 141 records this performance information obtained at or around time T10 in status information 151. The communication management resource 141 or other suitable entity assigns a grade of very good (VG) to the symbol 172 associated with the performance of backhaul 121 to indicate very good backhaul performance.

As further shown, the performance of the backhaul 121 substantially degrades at or around time T11. For example, based on further backhaul testing (such as in a manner as previously discussed) at or around time T11, the communication management resource 141 detects that the backhaul 121 provides a poor uplink bandwidth of 50 MBS (Mega Bytes per Second), a poor downlink bandwidth of 60 MBS, and a medium latency (medium communication transmission delay). As shown, the communication management resource 141 records this performance information obtained at or around time T11 in status information 151. The communication management resource 141 or other suitable entity assigns a grade of poor (POOR) to the symbol 172 associated with the performance of backhaul 121 to indicate degrading or degraded performance of backhaul 121.

The performance of the backhaul 121 further degrades at or around time T12. For example, based on further backhaul testing (such as in a manner as previously discussed) at or around time T12, the communication management resource 141 detects that the backhaul 121 provides a poor uplink bandwidth of 5 MBS (Mega Bytes per Second), a poor downlink bandwidth of 10 MBS, and a high latency (high communication transmission delay). As shown, the communication management resource 141 records this performance information obtained at or around time T12 in status information 151. The communication management resource 141 or other suitable entity assigns a grade of poor (POOR) to the symbol 172 associated with the performance of backhaul 121 to indicate degrading or degraded backhaul performance.

The performance of the backhaul 121 further degrades at or around time T13. For example, based on further backhaul testing (such as in a manner as previously discussed) at or around time T13, the communication management resource 141 detects that the backhaul 121 provides a poor bandwidth of 0 MBS (Mega Bytes per Second) at a high latency (high or infinite communication transmission delay). As shown, the communication management resource 141 records this performance information obtained at or around time T13 in status information 151. The communication management resource 141 or other suitable entity assigns a grade of poor (POOR) to the symbol 172 associated with the performance of backhaul 121 to indicate degrading or degraded backhaul performance.

The performance of the backhaul 121 is degraded at time T14. For example, based on further backhaul testing (such as in a manner as previously discussed) at or around time T14, the communication management resource 141 detects that the backhaul 121 provides a poor bandwidth of 0 MBS (Mega Bytes per Second) at a high latency (high or infinite communication transmission delay). As shown, the communication management resource 141 records this performance information obtained at or around time T14 in status information 151. The communication management resource 141 or other suitable entity assigns a grade of poor (POOR) to the symbol 172 associated with the performance of backhaul 121 to indicate degrading or degraded backhaul performance.

In this manner, the status information 151 keeps track of the communication performance associated with the backhaul 121 over time.

FIG. 3 is an example diagram illustrating display of status information associated with a backhaul according to embodiments herein.

Note that in accordance with further example embodiments, the status information 151 is or includes display information encoded for display on a display screen 330 of the mobile communication device 150. As previously discussed, the display information such as present in the communications 135-10 (communicated over wireless communication link 127 of FIG. 1) to the mobile communication device 150 indicates a respective status of the backhaul 121.

As further shown, the mobile communication device 150 includes a decoder 320 operative to decode the received communication 135-10 into symbol 172 for time T10. In one embodiment, the communication 135-10 associated with time T10 is tagged with information indicating that the content of the communication 135-10 is directed to decoder 320 (and display region 156) for display of a respective encoded symbol 172 in display region 156 of display screen 330. Thus, in this example embodiment, the decoder 320 decodes the received communication 135-10 and initiates display of corresponding symbol 172 (decoded from communication 135-10) in display region 156 of the display screen 330 of the mobile communication device 150. Display of the symbol 172 notifies the respective user 108 that the backhaul 121 provides good performance at the current time of around time T10.

As previously discussed, the performance of the backhaul 121 may change over time. For example, at time T14, the performance of the backhaul 121 is poor. In a similar manner as previously discussed, the mobile communication device 150 includes a decoder 320 operative to decode the received communication 135-14 into symbol 172 associated with time T14. In one embodiment, the communication 135-14 associated with time T14 is tagged with information indicating that the content of the communication 135-14 is directed to decoder 320 and/or display region 156 for display of a respective encoded symbol 172 in display region 156 of display screen 330. Thus, the decoder 320 decodes the received communication 135-14 and initiates display of corresponding symbol 172 (decoded from communication 135-14) in display region 332 of the display screen 330. Display of the symbol 172 associated with time T14 notifies the respective user 108 that the backhaul 121 provides poor performance at the current time of around time T14.

In this manner, the communication management resource 141 provides constant updates of the performance status of backhaul 121 to the user 108. Thus, embodiments herein include, via the communication management resource 141, communicating display information (such as encoded status information) in one or more communications 135 to the mobile communication device 150; the display information (symbol 172, which changes over time) indicates the current ability/performance of the backhaul 121 to convey the data communications.

As previously discussed, the display information (and corresponding status message) associated with symbol 172 is complementary with respect to the display symbol 171 on the mobile communication device 150. For example, the symbol 171 indicates a strength of wireless signals (such as communications 135) associated with wireless communication link 127 between the mobile communication device 150 and the first wireless access point 131. A high signal strength indicated by the symbol 171 only indicates that the connection between the mobile communication device 150 and the wireless access point 131 is good. It does not indicate performance of backhaul 121. As a complement to the wireless signal strength information indicated by symbol 171, the symbol 172 (display information associated with the backhaul 121) indicates a status of the backhaul 121 and its ability to provide connectivity of the mobile communication device 150 with the remote network 190 through the backhaul 121.

Figure 4:
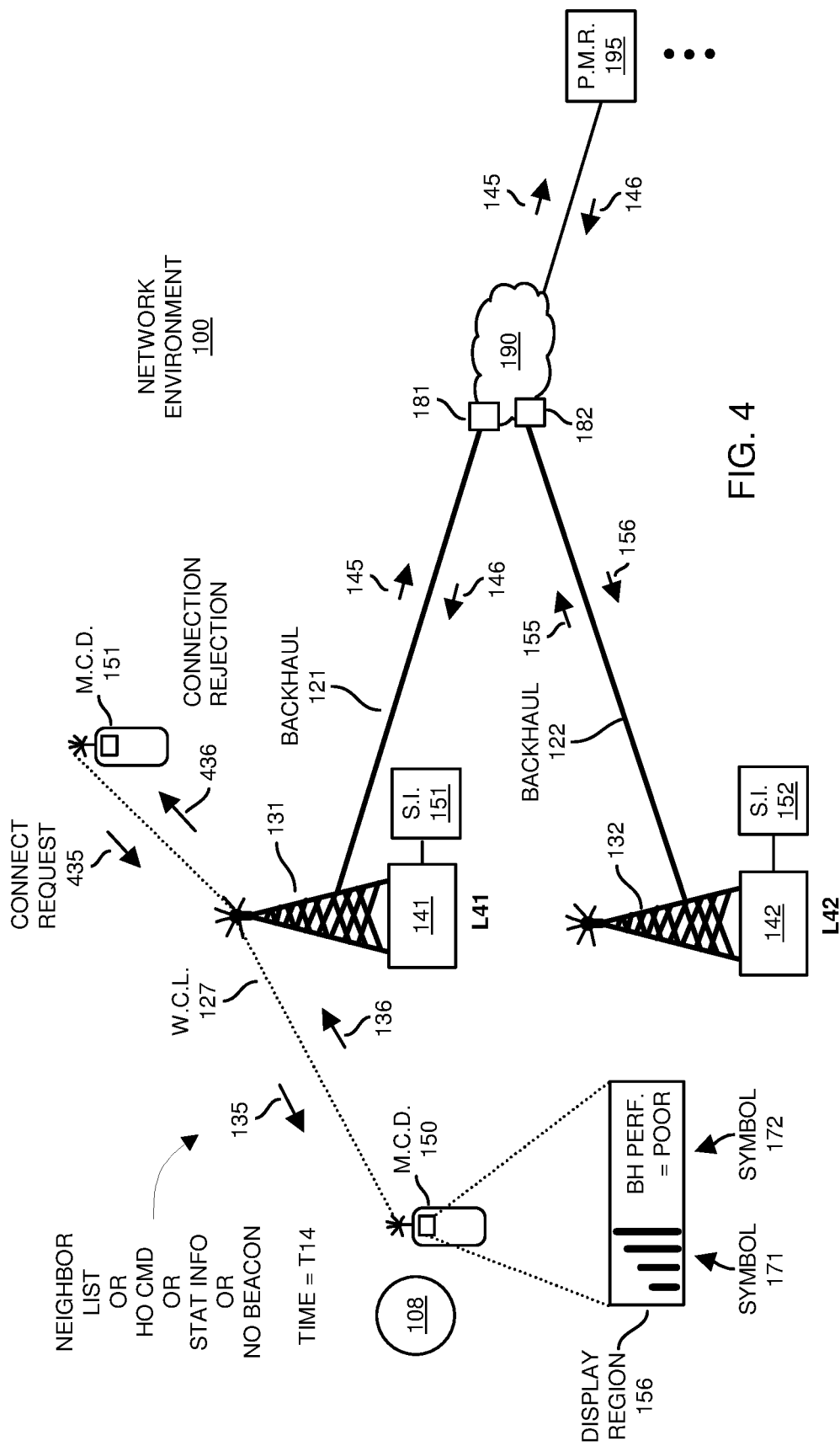
FIG. 4 is an example diagram illustrating control of wireless communication links based on status information according to embodiments herein.

FIG. 4 is an example diagram illustrating control of wireless communication links based on status information according to embodiments herein.

In response to a trigger event such as that the performance of the backhaul is detected as being below a threshold value, there are many ways in which the communication management resource 141 (or other suitable entity) can be configured to control/initiate termination of the respective wireless communication link 127 between the first wireless access point 131 and the mobile communication device 150.

For example, in one embodiment, in response to detecting poor performance of backhaul 121 below a threshold value, the communication management resource 141 or other suitable entity simply communicates a message (such as via communications 135) from the first wireless access point 131 to the mobile communication device 150. In one embodiment, as previously discussed, the messages communicated to the mobile communication device 150 from the wireless access point 131 (communication management resource 141) can include any or all of the status information 151 indicating the inability of the backhaul 121 to support communications.

In accordance with further embodiments, the first wireless access point 131 and communication management resource 141 controls or initiates a respective handoff of the mobile communication device 150 to a second wireless access point 132 in response to detecting degradation and/or the inability of the backhaul 121 to support communications above a performance threshold value. For example, in one embodiment, in furtherance of initiating a respective handoff of the first mobile communication device 150 with another wireless access point 131, the communication management resource 141 (or first wireless access point 131) can be configured to communicate neighbor list information indicating one or more other wireless access points (such as a second wireless access point 132, third wireless access point, and so on) that are available to provide the mobile communication device 150 wireless connectivity to the remote network 190.

In one embodiment, the neighbor list (such as conveyed via communications 135) includes an identity of the second wireless access point 132 in which to potentially handoff the first mobile communication device 150. In one embodiment, the mobile communication device 150 selects the second wireless access point 132 in the received neighbor list and performs a respective handoff.

Note that as an alternative to selecting from a respective neighbor list, in response to receiving notification of poor performance of backhaul 121, the mobile communication device can be configured to perform discovery of any wireless access point available in the network environment 100 and initiate a respective handoff to a selected one of the available wireless access points learned from the discovery.

In yet further example embodiments, in response to detecting degradation of the ability of the backhaul 121 to convey the data communications, the first wireless access point 131 can be configured to reject a new association of a second mobile communication device 151 attempting to establish a respective wireless communication link between the second mobile communication device 151 and the first wireless access point 131. For example, in one embodiment, the mobile communication device 151 sends a connection request 435 to the wireless access point 131. In response to receiving the request and detecting that the performance of the backhaul 121 is below threshold value, the wireless access point 131 communicates a respective rejection communication 436 to the mobile communication device 151.

Thus, even though performance of a respective wireless communication link between the second mobile communication device 151 and the first wireless access point 131 may be above a threshold value indicating good wireless performance capability, the communication management resource 141 associated with the first wireless access point 131 can be configured to reject any new association request from the second mobile communication device 151 such as in response to a condition in which the backhaul 121 will not be able provide sufficient communication performance on behalf of the second mobile communication device 151.

In yet further example embodiments, note that the communication management resource 141 associated with the wireless access point 131 can be configured to prevent and/or disable transmission of discovery beacons in the network environment 100 during conditions in which the performance of the backhaul 120 is below a threshold value. In such an instance, because the mobile communication devices in the network environment 100 do not receive notifications of availability of the wireless access point 131, such mobile communication devices are not inclined to attempt to connect to the wireless access point 131.

Figure 5:
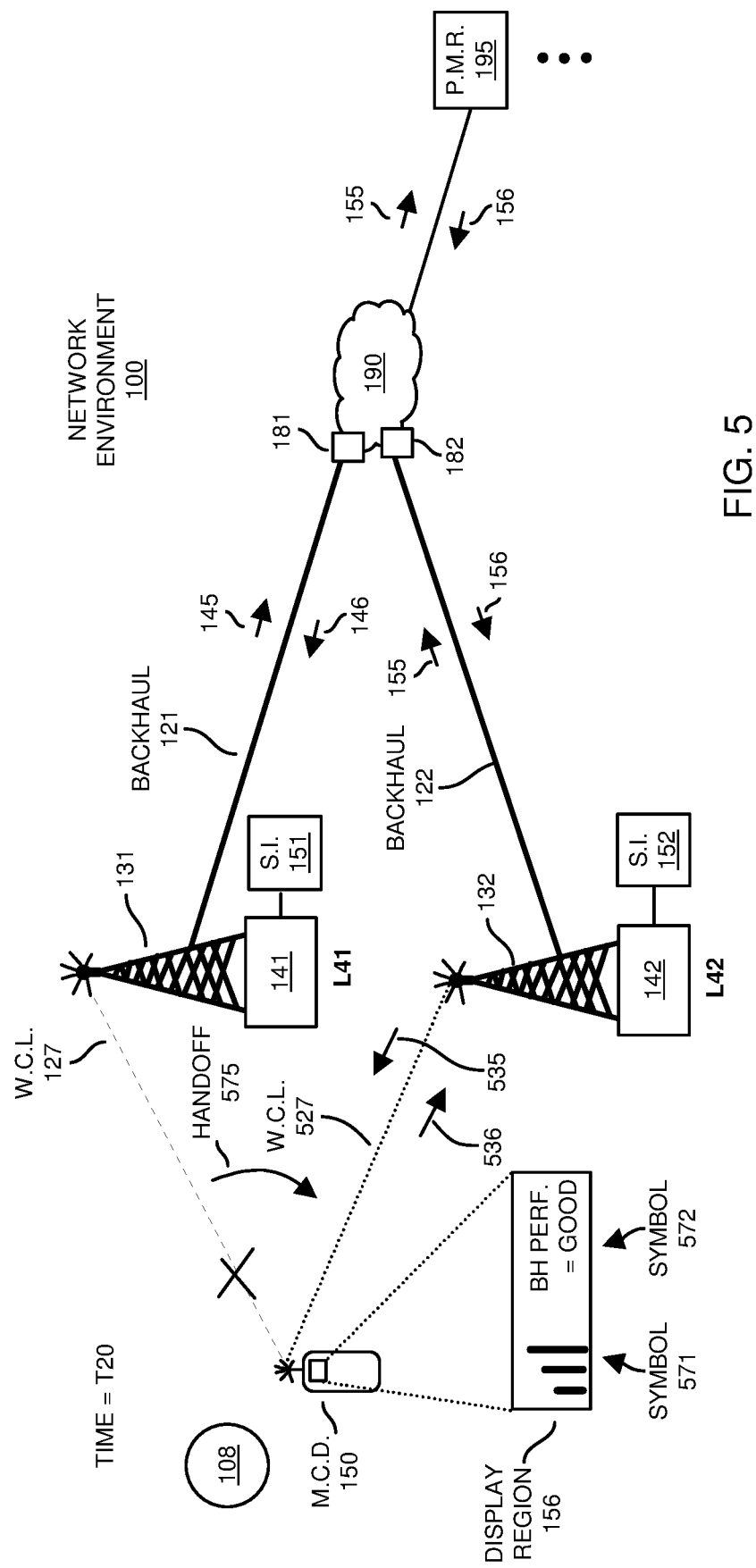
FIG. 5 is an example diagram illustrating forced handoff of a mobile communication device from a first wireless access point to a second wireless access point according to embodiments herein.

FIG. 5 is an example diagram illustrating forced handoff of a mobile communication device from a first wireless access point to a second wireless access point according to embodiments herein.

In response to a trigger event such as that the performance of backhaul 121 falls below a threshold value (such as because bandwidth supported by the backhaul 121 is below bandwidth threshold level and/or latency associated with conveyed communications is above a threshold level), the wireless access point 131 and/or mobile communication device 150 initiate a handoff 575 of the mobile communication device 150 from the wireless access point 131 to the wireless access point 132.

In a manner as previously discussed, the communication management resource 142 associated with the wireless access point 132 can be configured to test the performance of backhaul 122 via communications 155 and 156 to and from performance management resource 195 over backhaul 156. The communication management resource 142 stores the performance information associated with the backhaul 122 as status information 152.

Assume in this example embodiment that the backhaul 122 provides good performance based on the performance testing as previously discussed. In such an instance, subsequent to the mobile communication device 150 establishing the wireless communication link 527 with the wireless access point 132, the communication management resource 142 transmits communications 535 to the mobile communication device. In one embodiment, the communications 535 from communication management resource 142 or other suitable entity includes encoded performance information derived from the status information 152. The performance information (such as backhaul performance=GOOD) associated with performance analysis at or around time T20 (such as time of testing the backhaul 122) indicates a respective symbol 572 to display in display region 156. As previously discussed, the communications 535 from the wireless access point 132 to the mobile communication device 150 include performance information associated with backhaul 122 tagged with information indicating to display in display region 156.

In this manner, in a similar manner as previously discussed, the information displayed in display region 156 provides a status of the backhaul 122 to the corresponding user of the mobile communication device 150 after the respective handoff 575.

Figure 6:
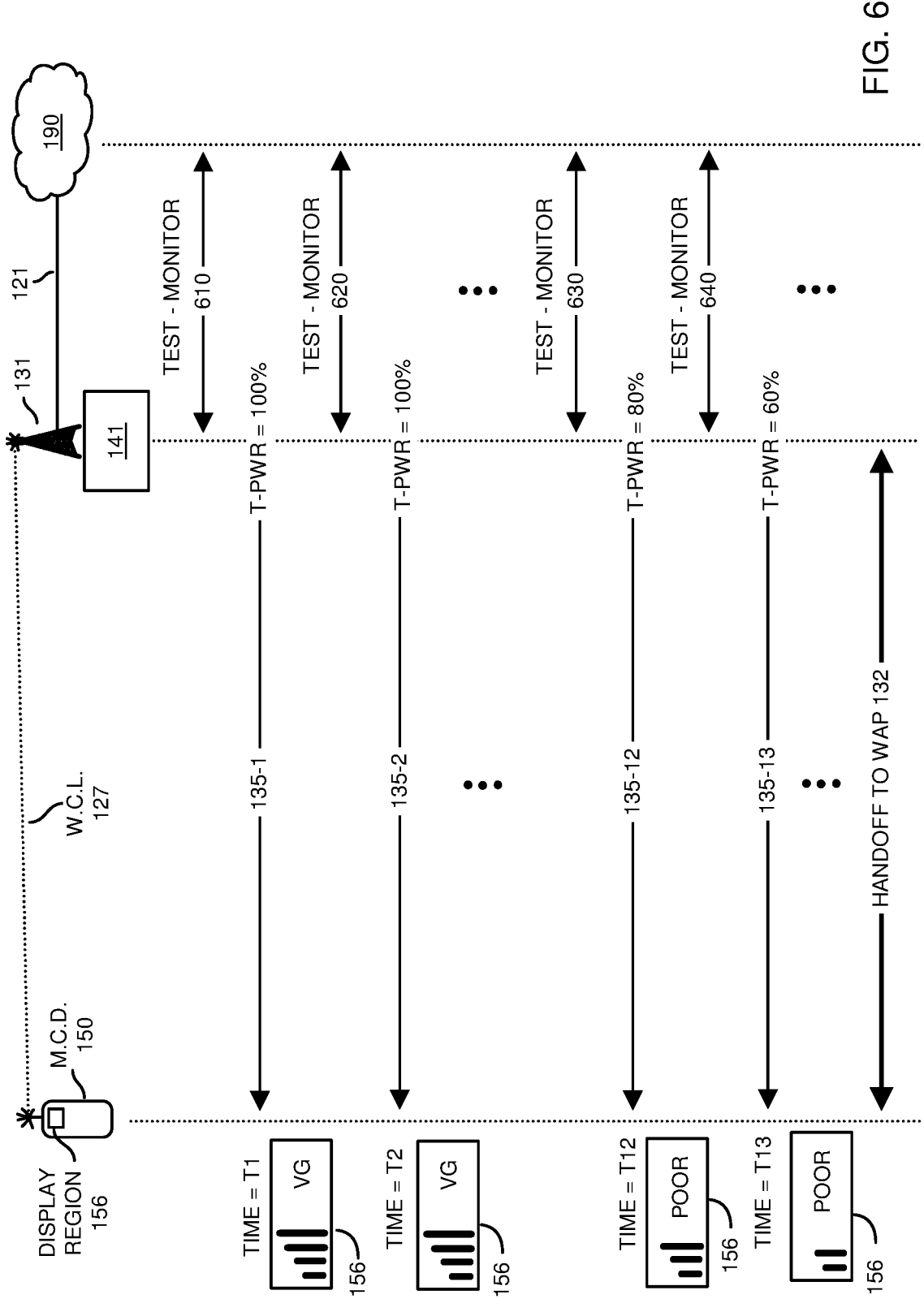
FIG. 6 is an example diagram illustrating control of wireless transmit power to handoff a respective mobile communication device according to embodiments herein.

FIG. 6 is an example diagram illustrating control of wireless transmit power to handoff a respective mobile communication device according to embodiments herein.

In yet further example embodiments, in response to detecting performance degradation of the backhaul 121 below a performance threshold, the communication management resource 141 eventually initiates a handoff of the mobile communication device 150 to another wireless access point such as wireless access point 132 after time T13.

As an example, in one embodiment, in response to detecting performance degradation of the respective backhaul 121, to force a handoff of the mobile communication device 150 from one wireless access point to another, the communication management resource 141 reduces a wireless transmit power level of the first wireless access point 131 transmitting wireless communications 135 over the wireless communication link 127 to the mobile communication device 150.

More specifically, as shown in FIG. 6, at or around time T1, the communication management resource 141 initiates testing of the backhaul 121 via test 610 in a manner as previously discussed (see FIG. 2 and corresponding text). As further shown in FIG. 6, the wireless access point 131 transmits communication 135-1 at a 100% of maximum power level because the backhaul 121 supports very good communication performance between the wireless access point 131 and the remote network 190. The display region 156 of the mobile communication device 150 at or around time T1 displays information (such as symbols 171 and 172 such as in display region 156) indicating good signal strength of receiving wireless communications 135-1 and a backhaul 121 providing very good (VG) performance.

At or around time T2, the communication management resource 141 initiates testing of the backhaul 121 via test 620 in a manner as previously discussed. As further shown, the wireless access point 131 transmits communication 135-2 at a 100% of maximum power level because the backhaul 121 supports very good communication performance between the wireless access point 131 and the remote network 190. The display region 156 of the mobile communication device 150 at or around time T2 displays information (such as symbols 171 and 172 such as in display region 156) indicating good signal strength of receiving wireless communications 135-2 and a backhaul 121 providing very good (VG) performance.

Eventually, at or around time T11, as previously discussed, the performance of the backhaul 121 conveying communications degrades. In response to this condition, the communication management resource 141 (wireless access point 131) initiates a handoff of the mobile communication device 150 to a different wireless access point.

For example, at or around time T12, the communication management resource 141 initiates testing of the backhaul 121 via test 630. In response to detecting performance degradation of the backhaul 121 above a threshold value, the wireless access point 131 initiates a respective handoff of the corresponding mobile communication device 150 to the wireless access point 132. In furtherance of initiating a handoff, the wireless access point 131 transmits communication 135-12 at 80% of maximum power level (in other words the wireless access point 131 produces a respective transmit power level of wirelessly communicating with the mobile communication device 150) because the backhaul 121 provides poor communication performance between the wireless access point 131 and the remote network 190. The display region 156 of the mobile communication device 150 displays information (such as symbols 171 and 172 in display region 156) at time T12 indicating fairly good signal strength of receiving wireless communications 135 and a backhaul 121 providing poor performance.

In furtherance of initiating a handoff, the wireless access point 131 transmits communication 135-13 at 60% of maximum power level (in other words the wireless access point 131 produces a respective transmit power level of wirelessly communicating with the mobile communication device 150) because the backhaul 121 provides poor communication performance between the wireless access point 131 and the remote network 190. The display region 156 of the mobile communication device 150 displays information (such as symbols 171 and 172 in display region 156) indicating poor signal strength of receiving wireless communications 135 and a backhaul 121 providing poor performance.

After time T13, the mobile communication device initiates a handoff from wireless access point 131 to wireless access point 132.

Thus, reducing the transmit power level of the wireless access point 131 results in a handoff of the mobile communication device 150 from the first wireless access point 131 to a second wireless access point 132 because the mobile communication device 150 detects the reduced transmit power level of receiving wireless communications 135.

In one embodiment, the mobile communication device 150 detects the reduction power level and initiates a handoff from the first wireless access point in response to detecting that the power level of receiving wireless communications 135 from the wireless access point 131 falls below a respective power threshold value. Thus, in one embodiment, in response to detecting the reduction in the power level of received wireless communications 135 from the wireless access point 131, the mobile communication device 150 initiates the respective handoff.

Accordingly, embodiments herein include, at the wireless access point 131, controlling a transmit power level of communications to the mobile communication device 150 to initiate a respective handoff from the first wireless access point 131 to the second wireless access point 132.

In still further example embodiments, as previously discussed, note that in response to detecting degradation of the ability of the backhaul 121 (such as below a bandwidth threshold value or latency threshold value) to convey data communications (such as via communications 145 and 146 in FIG. 1), the communication management resource 141 of the first wireless access point 131 can be configured to discontinue broadcasting of wireless beacons indicating availability of the first wireless access point 131 in the network environment 100. Discontinued communication of the beacons prevents any new mobile communication devices from learning of the wireless access point 131 and attempting to establish wireless connectivity with the first wireless access point 131 to access remote network 190.

Figure 7:
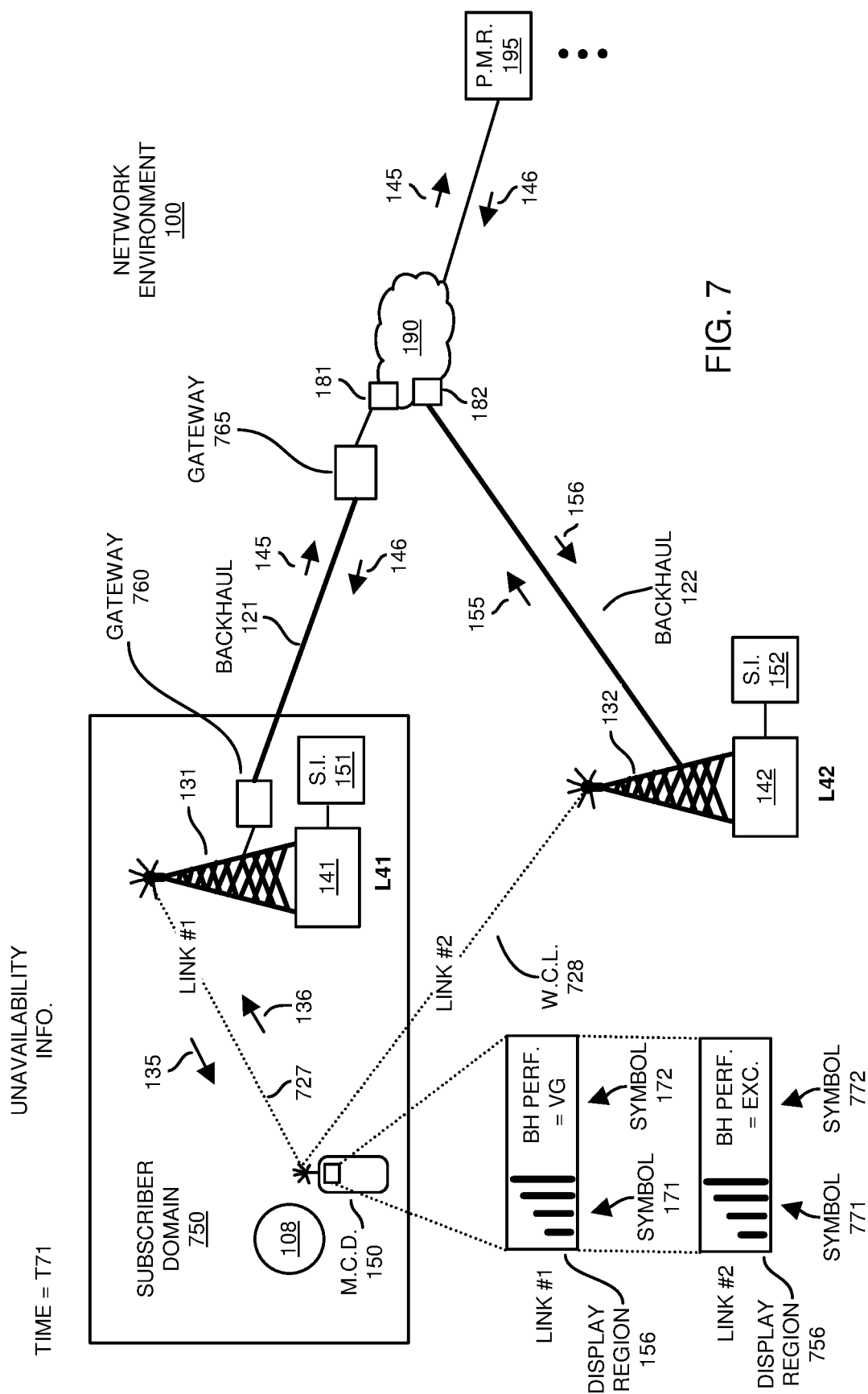
FIG. 7 is an example diagram illustrating dual wireless connectivity according to embodiments herein.

FIG. 7 is an example diagram illustrating dual wireless connectivity according to embodiments herein.

In one nonlimiting example embodiment, the communication management resource 141 and/or wireless access point 131 reside in a subscriber domain 750 and establish the backhaul 121 as a connection through one or more gateways such as gateway 760 (such as a cable modem) and gateway 765 (such as a cable modem termination system) to the remote network 190.

In one non-limiting example embodiment, subscriber domain 750 represents a residence (such as a home network environment) of a respective subscriber 108 subscribing to services associated with use of a communication link (such as backhaul 121 or shared communication link). All or a portion of the communication link (backhaul) may be shared between gateway 760 and gateway 765 as with a cable network service or PON (Passive Optical Network) service. The gateway 760 and gateway 765 also may be an xDSL (x Digital Subscriber Line) service or a dedicated fiber service.

As further shown, a network service provider associated with the gateways provides the subscriber domain 150 and corresponding subscriber 108 access to a remote network 190 (such as the Internet) via a combination of the gateway 760 such as a cable MODEM (such as supporting DOCSIS or other communication protocols) or other suitable type of communication device disposed in the subscriber domain 150.

When implemented via cable modem technology such as supporting DOCSIS (Data Over Cable Service Interface Specification) or other suitable communication protocol, the backhaul 121 connection through the gateway 760 and the gateway 765 may become unavailable due to testing, maintenance, etc., of the corresponding backhaul 121 there between. The communication management resource 141 can be configured to receive notification of maintenance from any suitable resource. In such an instance, for one or more scheduled windows of time for testing backhaul 121, the backhaul 121 is temporarily unavailable.

In one embodiment, in response to the communication management resource 141 receiving notification of temporary unavailability of the backhaul 121 due to testing or general maintenance of gateways, backhaul, etc., for each of the times when the backhaul 121 will be unavailable, the communication management resource 141 initiates termination of the wireless communication link 727 (wireless connectivity) between the wireless access point 131 and the mobile communication device 150.

In still further example embodiments, as shown in FIG. 7, the mobile communication device 150 supports multi-link capability. For example, in one embodiment, the mobile communication device 150 is in wireless communication with the wireless access point 131 over wireless communication link 727. The mobile communication device 150 is also in wireless communication with a second wireless access point 132 over a second wireless communication link 728.

In one embodiment, the second wireless communication link 728 provides the mobile communication device 150 backup access to the remote network 190 with respect to the wireless communication link 727 providing the mobile communication device 150 primary access to the remote network 190. In other words, if a primary backhaul 121, wireless communication link 727 (LINK #1) and/or the first wireless access point 131 fails or communication performance of any of these resources falls below a respective performance threshold value, the mobile communication device 150 switches to communicating over the wireless link 728 with the second wireless access point 132, which has a backhaul 122 that operates above a performance threshold value.

As further shown, in the multi-link connection operation of the mobile communication device 150 includes the mobile communication device 150 simultaneously connecting to both wireless access point 131 and wireless access point 132. The mobile communication device 150 can be configured to receive status information such as backhaul performance information associated with each of the backhaul 121 and backhaul 122. In a manner as previously discussed, the mobile communication device 150 can be configured to receive the encoded performance information associated with the backhauls 121 and 122 and display the respective status of each of the backhauls 121 and 122 to the corresponding user 108. In such an instance, the user 108 is able to determine not only the performance of the respective wireless communication links 727 and 728, but also the performance of the respective backhaul 121 associated with the wireless access point 131 and first wireless communication link 727 and the performance of the respective backhaul 122 associated with the wireless access point 132 and the second wireless communication link 728.

More specifically, in this example embodiment, symbol 171 displayed in display region 156 in a display screen of the mobile communication device 150 indicates a performance status (such as signal strength) associated with the wireless communication link 727; symbol 172 displayed in the display region 156 of the mobile communication device 150 indicates a performance status associated with the backhaul 121.

Symbol 771 displayed in display region 756 of the display screen of the mobile communication device 150 indicates a performance status (such as signal strength) associated with the wireless communication link 728; symbol 772 displayed in the display region 156 of the mobile communication device 150 indicates a performance status associated with the backhaul 122.

Accordingly, the performance information in the display region 131 and display region 156 indicates a respective status associated with each of the different communication links between the mobile communication device 150 and the remote network 190.

Figure 8:
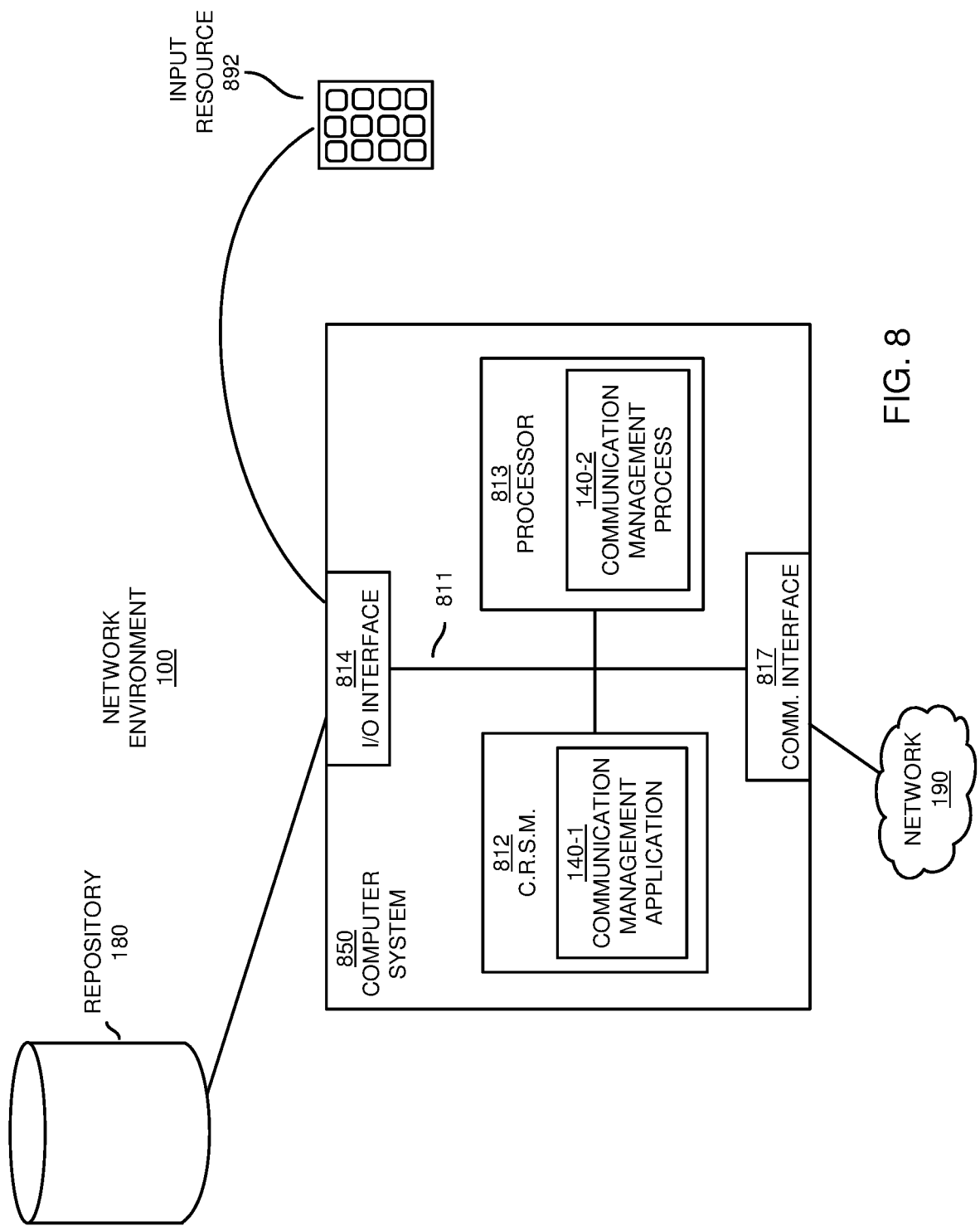
FIG. 8 is an example diagram illustrating example computer architecture operable to execute one or more operations according to embodiments herein.

FIG. 8 is an example block diagram of a computer system for implementing any of the operations as previously discussed according to embodiments herein.

Any of the resources (such as mobile communication devices, wireless access points, communication management resource, converter resource, allocation management resource, etc. etc.) as discussed herein can be configured to include computer processor hardware and/or corresponding executable instructions to carry out the different operations as discussed herein via computer system 850.

As shown, computer system 850 of the present example includes an interconnect 811 that coupling computer readable storage media 812 such as a non-transitory type of media (which can be any suitable type of hardware storage medium in which digital information can be stored and retrieved), a processor 813 (computer processor hardware), I/O interface 814, and a communications interface 817.

I/O interface(s) 814 supports connectivity to repository 880 and input resource 892.

Computer readable storage medium 812 can be any hardware storage device such as memory, optical storage, hard drive, floppy disk, etc. In one embodiment, the computer readable storage medium 812 stores instructions and/or data.

As shown, computer readable storage media 812 can be encoded with management application 140-1 (e.g., including instructions) to carry out any of the operations as discussed herein.

During operation of one embodiment, processor 813 accesses computer readable storage media 812 via the use of interconnect 811 in order to launch, run, execute, interpret or otherwise perform the instructions in management application 140-1 stored on computer readable storage medium 812. Execution of the management application 140-1 produces management process 140-2 to carry out any of the operations and/or processes as discussed herein. In other words, management application 140-1 can be configured to execute operations associated with wireless access point 131 communication management resource 140, etc.

Those skilled in the art will understand that the computer system 850 can include other processes and/or software and hardware components, such as an operating system that controls allocation and use of hardware resources to execute management application 140-1.

In accordance with different embodiments, note that computer system may reside in any of various types of devices, including, but not limited to, a mobile computer, a personal computer system, wireless station, connection management resource, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein. In one embodiment, the control system 850 can include or be implemented in virtualization environments such as the cloud.

Functionality supported by the different resources will now be discussed via flowcharts in FIG. 9. Note that the steps in the flowcharts below can be executed in any suitable order.

Figure 9:
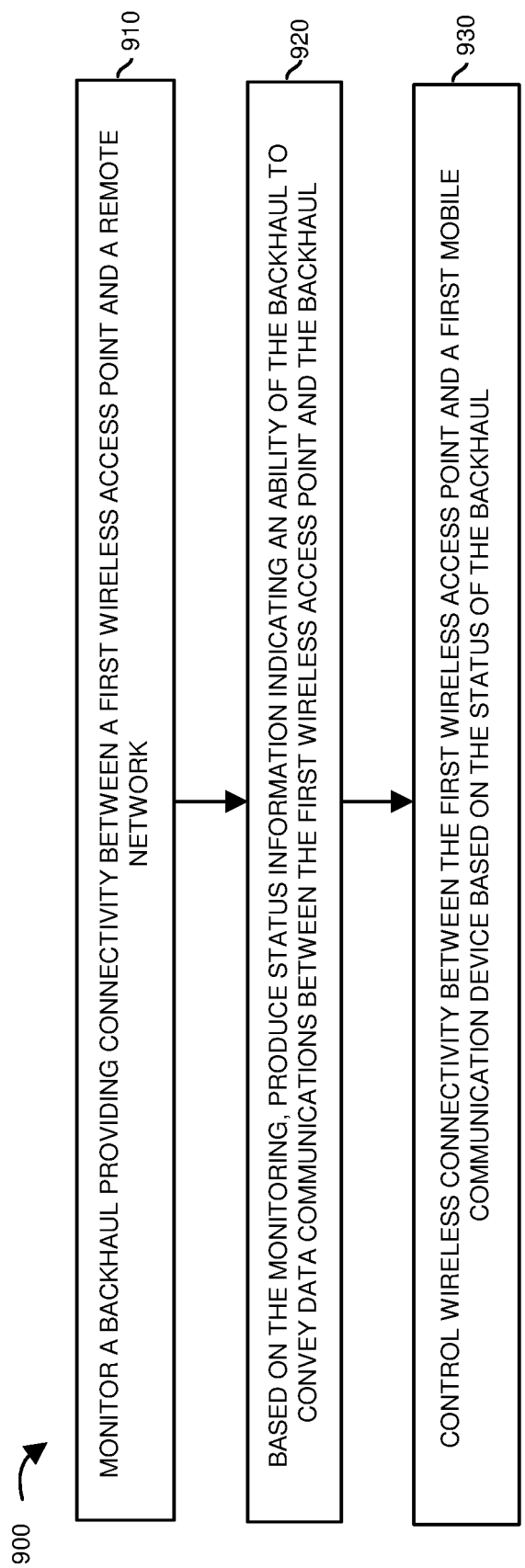
FIG. 9 is an example diagram illustrating a method according to embodiments herein.

FIG. 9 is a flowchart 900 illustrating an example method according to embodiments. Note that flowchart 900 overlaps/captures general concepts as discussed herein.

In processing operation 910, the communication management resource 141 monitors a backhaul 121 providing connectivity between a first wireless access point 131 and a remote network 190.

In processing operation 920, based on the monitoring, the communication management resource 141 produces status information 151 indicating an ability of the backhaul 121 to convey data communications between the first wireless access point 131 and the remote network 190.

In processing operation 930, the communication management resource 141 controls wireless connectivity between the first wireless access point 131 and a first mobile communication device 150 based on the status of the backhaul 121.

Note again that techniques herein are well suited to facilitate redirection (such as handoffs) of wireless devices amongst wireless access points in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
    monitoring a bandwidth performance of a backhaul, the backhaul providing connectivity between a first wireless access point and a remote network;
    based on the monitored bandwidth performance of the backhaul, producing status information indicating an ability of the backhaul to convey data communications between the first wireless access point and the remote network;
    controlling wireless connectivity between the first wireless access point and a first mobile communication device based on the monitored bandwidth performance of the backhaul; and
    wherein controlling wireless connectivity between the first wireless access point and the first mobile communication device includes: communicating a message to the first mobile communication device, the message tagged with a tag value indicating a decoder in the first mobile communication device to which the message is directed, the message including the status information.

2. The method as in claim 1, wherein controlling the wireless connectivity includes:
    communicating a neighbor list indicating a second wireless access point in which to potentially handoff the first mobile communication device in response to detecting degradation of the bandwidth performance to convey the data communications over the backhaul.

3. The method as in claim 1 further comprising:
    establishing a wireless communication link between the first wireless access point and the first mobile communication device; and
    wherein controlling the wireless connectivity includes: in response to detecting degradation of the ability of the backhaul to convey the data communications, reducing a wireless transmit power level of the first wireless access point transmitting wireless communications over the wireless communication link to the first mobile communication device.

4. The method as in claim 3, wherein reducing the wireless transmit power level of the first wireless access point results in a handoff of the first mobile communication device from the first wireless access point to a second wireless access point.

5. The method as in claim 1, wherein the backhaul is an only connection between the first wireless access point and the remote network.

6. The method as in claim 1, wherein controlling the wireless connectivity includes:
    in response to detecting degradation of the ability of the backhaul to convey the data communications between the first wireless access point and the remote network, rejecting association of a second mobile communication device attempting to establish a new wireless communication link between the second mobile communication device and the first wireless access point.

7. The method as in claim 1, wherein controlling the wireless connectivity includes:
    in response to detecting degradation of the ability of the backhaul to convey the data communications, discontinuing broadcast of wireless beacons indicating availability of the first wireless access point.

8. The method as in claim 1, wherein monitoring the bandwidth performance of the backhaul includes:
    transmitting test communications from the first wireless access point over the backhaul to a performance management resource in the remote network to test the ability of the backhaul to convey the data communications.

9. The method as in claim 1 further comprising:
    communicating display information to the first mobile communication device, the display information indicating the ability of the backhaul to convey the data communications.

10. The method as in claim 1, wherein the first mobile communication device is in wireless communication with the first wireless access point over a first wireless communication link; and
    wherein the first mobile communication device is in wireless communication with a second wireless access point over a second wireless communication link, the second wireless communication link providing the first mobile communication device backup access to the remote network with respect to the first wireless communication link.

11. The method as in claim 1, wherein monitoring the bandwidth performance of the backhaul includes:
    from the first wireless access point, testing the ability of the backhaul to convey data via communication of test messages over the backhaul; and
    from the testing, determining a maximum bandwidth rate of conveying the data over the backhaul from the first wireless access point to a performance management resource in the remote network.

12. The method as in claim 1 further comprising:
    establishing the backhaul as a connection through a cable modem and cable modem termination system to the remote network.

13. The method as in claim 1 further comprising:
    at the first wireless access point:
    in response to notification of temporary unavailability of the backhaul due to maintenance, initiating termination of the wireless connectivity between the first wireless access point and the mobile communication device.

14. The method as in claim 1, wherein the decoder of the first mobile communication device is operative to convert the message into a first symbol for display on a display screen of the first mobile communication device.

15. The method as in claim 14, wherein the first symbol is adjusted over time to indicate different levels of the bandwidth performance associated with the backhaul over time.

16. The method as in claim 14, wherein the display screen of the mobile communication device includes a first display region dedicated to display the first symbol.

17. The method as in claim 1, wherein controlling the wireless connectivity between the first wireless access point and the first mobile communication device based on the monitored bandwidth performance of the backhaul includes:
  transmitting wireless communications from the first wireless access point at a first wireless power level to the first mobile communication device in response to detecting that the backhaul provides a first bandwidth performance level; and
  in response to detecting degradation of the bandwidth performance associated with the backhaul from the first bandwidth performance level to a second bandwidth performance level, transmitting the wireless communications from the first wireless access point at a second wireless power level to the first mobile communication device, the second wireless power level less than the first wireless power level.

18. The method as in claim 17, wherein controlling the wireless connectivity between the first wireless access point and the first mobile communication device based on the monitored bandwidth performance of the backhaul includes:
  in response to detecting further degradation of the bandwidth performance associated with the backhaul from the second bandwidth performance level to a third bandwidth performance level, transmitting the wireless communications from the first wireless access point to the first mobile communication device at a third wireless power level, the third wireless power level less than the second wireless power level.

19. The method as in claim 18, wherein reduction from the first wireless power level to the third wireless power level causes the mobile communication device to handoff from the first wireless access point to a second wireless access point.

20. The method as in claim 1, wherein monitoring the bandwidth performance of the backhaul includes:
  ramping a rate of transmitting data packets from the first wireless access point over the backhaul to a performance management resource in the remote network to test the ability of the backhaul to convey the data communications.

21. The method as in claim 20, wherein monitoring the bandwidth performance of the backhaul further includes: detecting a maximum rate at which the backhaul supports conveyance of the data packets over the backhaul to the performance management resource; and
  wherein producing the status information includes: producing the status information based on the detected maximum rate.

22. The method as in claim 1, wherein monitoring the bandwidth performance of the backhaul includes:

communicating a ping message from the first wireless access point over the backhaul to a remote management entity in the remote network; and
generating the status information based on a time duration between a first time instance of transmitting the ping message from the first wireless access point and a second time instance of receiving a ping response at the first wireless access point over the backhaul from the remote management entity.

23. A system comprising:
a communication management resource operative to:
  monitor a bandwidth performance of a backhaul providing connectivity between a first wireless access point and a remote network;
  based on the monitored bandwidth performance of the backhaul, produce status information indicating an ability of the backhaul to convey data communications between the first wireless access point and the remote network;
  control wireless connectivity between the first wireless access point and a first mobile communication device based on the monitored bandwidth performance of the backhaul; and
  wherein the controlled wireless connectivity between the first wireless access point and the first mobile communication device includes: communication of a message from the first wireless access point to the first mobile communication device, the message tagged with a tag value indicating a decoder in the first mobile communication device to which the message is directed, the message including the status information.

24. The system as in claim 23, wherein the communication management resource is further operable to:
  communicate a neighbor list indicating a second wireless access point in which to handoff the first mobile communication device.

25. The system as in claim 23, wherein the communication management resource is further operable to:
  establish a wireless communication link between the first wireless access point and the first mobile communication device; and
  in response to detecting degradation of the ability of the backhaul to convey the data communications, reduce a wireless transmit power level of the first wireless access point transmitting wireless communications over the wireless communication link to the first mobile communication device.

26. The system as in claim 25, wherein reduction in the wireless transmit power level of the first wireless access point results in a handoff of the first mobile communication device from the first wireless access point to a second wireless access point.

27. The system as in claim 23, wherein the backhaul is an only connection between the first wireless access point and the remote network.

28. The system as in claim 23, wherein the communication management resource is further operable to:
  in response to detecting degradation of the ability of the backhaul to convey the data communications, reject a link request from a second mobile communication device attempting to establish a wireless communication link between the second mobile communication device and the first wireless access point.

29. The system as in claim 23, wherein the communication management resource is further operable to:

in response to detecting degradation of the ability of the backhaul to convey the data communications, discontinue broadcast of wireless beacons indicating availability of the first wireless access point.

30. The system as in claim 23, wherein the communication management resource is further operable to:
transmit communications over the backhaul to test the ability of the backhaul to convey the data communications.

31. The system as in claim 23, wherein the communication management resource is further operative to:
communicate display information to the first mobile communication device, the display information indicating the ability of the backhaul to convey the data communications.

32. The system as in claim 23, wherein the first mobile communication device is in wireless communication with the first wireless access point over a first wireless communication link; and
wherein the first mobile communication device is in wireless communication with a second wireless access point over a second wireless communication link, the second wireless communication link providing the first mobile communication device backup access to the remote network with respect to the first wireless communication link.

33. The system as in claim 23, wherein the communication management resource is further operable to:
from the first wireless access point, test the ability of the backhaul to convey data via communication of test messages over the backhaul.

34. The system as in claim 23, wherein the communication management resource is further operable to:
establish the backhaul as a connection through a cable modem and cable modem termination system to the remote network.

35. The system as in claim 23, wherein the communication management resource is further operable to:
at the first wireless access point:
in response to notification of temporary unavailability of the backhaul due to maintenance testing, initiate termination of the wireless connectivity between the first wireless access point and the mobile communication device.

36. A method comprising:
monitoring a bandwidth performance of a backhaul, the backhaul providing connectivity between a first wireless access point and a remote network;
based on the monitored bandwidth performance of the backhaul, producing status information indicating an ability of the backhaul to convey data communications between the first wireless access point and the remote network; and
controlling wireless connectivity between the first wireless access point and a first mobile communication device based on the monitored bandwidth performance of the backhaul;
wherein controlling the wireless connectivity includes:
in response to detecting degradation of the ability of the backhaul to convey the data communications based on reduction in the bandwidth performance of the backhaul to convey the data communications over the backhaul, communicating a message from the first wireless access point to the first mobile communication device, the message including the status information, the status information indicating the reduction in the bandwidth performance, the message tagged with control information indicating that the message is directed to a decoder controlling display of a symbol on a display screen of the first mobile communication device.

37. Computer-readable storage hardware having instructions stored thereon, the instructions, when carried out by computer processor hardware, cause the computer processor hardware to:
monitor a backhaul providing connectivity between a first wireless access point and a remote network;
based on the monitoring, produce status information indicating an ability of the backhaul to convey data communications between the first wireless access point and the remote network, the status information produced based on testing of the backhaul to convey the data communications;
control wireless connectivity between the first wireless access point and a first mobile communication device based on the status of the backhaul; and
wherein controlled wireless connectivity between the first wireless access point and the first mobile communication device includes: communication of a message to the first mobile communication device, the message tagged with a tag value indicating a decoder in the first mobile communication device to which the message is directed, the message including the status information.

38. A method comprising:
monitoring a bandwidth performance of a backhaul, the backhaul providing connectivity between a first wireless access point and a remote network;
based on the monitored bandwidth performance of the backhaul, producing status information indicating an ability of the backhaul to convey data communications between the first wireless access point and the remote network;
controlling wireless connectivity between the first wireless access point and a first mobile communication device based on the monitored bandwidth performance of the backhaul;
wherein controlling the wireless connectivity further includes:
transmitting wireless communications from the first wireless access point at a first wireless power level to the first mobile communication device in response to detecting that the backhaul provides a first bandwidth performance level;
in response to detecting degradation of the bandwidth performance associated with the backhaul from the first bandwidth performance level to a second bandwidth performance level, transmitting the wireless communications from the first wireless access point at a second wireless power level to the first mobile communication device, the second wireless power level less than the first wireless power level;
in response to detecting further degradation of the bandwidth performance associated with the backhaul from the second bandwidth performance level to a third bandwidth performance level, transmitting the wireless communications from the first wireless access point to the first mobile communication device at a third wireless power level, the third wireless power level less than the second wireless power level;
communicating a message from the first wireless access point to the first mobile communication device, the message tagged with a tag value indicating a decoder in the first mobile communication device to which the message is directed, the message including the status information; and wherein the decoder of the first mobile communication device is operative to convert the message into a first symbol displayed on a display screen of the first mobile communication device, the display screen including a first display region dedicated to display the first symbol.

* * * * *